United States Patent [19]
Wolfe

[11] 3,908,221
[45] Sept. 30, 1975

[54] LAWN SWEEPER AND TRAILER

[76] Inventor: Daniel E. Wolfe, 344 W. Baltimore St., Greencastle, Pa. 17225

[22] Filed: Aug. 6, 1973

[21] Appl. No.: 385,918

[52] U.S. Cl. .................... 15/79; 15/83; 56/400.02
[51] Int. Cl.² ......................................... E01H 1/05
[58] Field of Search .................... 15/79–81, 83–86, 15/340; 56/362, 400.02

[56] References Cited
UNITED STATES PATENTS

| | | | |
|---|---|---|---|
| 850,005 | 4/1907 | Houle et al. | 15/84 |
| 865,311 | 9/1907 | Ludlow | 15/84 |
| 971,661 | 10/1910 | Brooks | 15/84 |
| 1,179,548 | 4/1916 | Mitchell | 15/84 |
| 1,216,969 | 2/1917 | Edwards | 15/83 |
| 2,263,722 | 11/1941 | Drumm | 15/83 |
| 2,561,500 | 7/1951 | D'Astici | 15/83 |
| 2,767,414 | 10/1956 | Parker et al. | 15/83 |
| 3,493,987 | 2/1970 | Longnecker | 15/83 |

*Primary Examiner*—Edward L. Roberts
*Attorney, Agent, or Firm*—Irvin A. Lavine

[57] ABSTRACT

A lawn sweeper and trailer are provided for towing behind a tractor. The sweeper has a rotary brush, and is supported by a pair of wheels. A trailer is connected to the sweeper, and includes a platform supported by a pair of rear wheels, a removable box or a pair of removable boxes being carried on the platform to receive leaves and debris. The forward part of the trailer platform on its upper surface is provided with upper and lower arms, between which is a tongue extending rearwardly from the sweeper; a vertical pin through the arms and tongues connects the sweeper and trailer. A caster wheel is carried beneath the forward trailer platform. Rearwardly of the brush, the sweeper has a rearwardly and upwardly inclined guide plate, supported on a support plate which is hinged to the forward end of a fixed plate of the sweeper to the rear of the brush; at this hinge there is a striker plate in juxtaposition with the brush. Front cover panels are hinged to the sweeper in spaced relation to the guide plates, and a pair of side panels define a channel with the guide plate and front cover panels, which latter may be transparent. Rearwardly of the side panels are flexible side guides mounted on the trailer. The caster wheel in an alternate embodiment may be mounted on the sweeper.

10 Claims, 5 Drawing Figures

LAWN SWEEPER AND TRAILER

BACKGROUND OF THE INVENTION

The present invention relates to a lawn sweeper of the rotary brush type, and to a trailer pivoted to it.

There have previously been provided various types of sweeping machines. Relatively large sweeping machines have been provided for sweeping large expanses, such as streets and parking lots. Relatively smaller machines have been provided for sweeping lawns, the smallest being pushed by hand and having an attached debris catcher construction rigidly connected to the sweeper portion. Somewhat larger lawn sweepers have been provided intended for towing behind tractors or small cars, such as the "Jeep", while others have been constructed somewhat along the line of the familiar riding lawn mower.

All of the known lawn sweepers have suffered from the deficiency that they could not be readily maneuvered, since the complete sweeper and receptacle portion structure was a rigid structure, having no articulation. This was not satisfactory because it did not permit the effective and efficient sweeping of all portions of a lawn, particularly where there were curved boundaries, such as by flower beds, walks, and the like. Known sweepers were either very large, for streets, or small, with limited capacity, requiring frequent unloading.

SUMMARY OF THE INVENTION

A lawn sweeper is provided, having a pair of support wheels and a rotary brush for directing leaves and debris in a rearward and upward direction. A trailer is provided, the trailer including a platform and a pair of rear wheels. Depending upon the size of the trailer, one or two removable receptacles may be carried on the platform, to receive material from the sweeper. The articulation between the sweeper and trailer is provided by a vertical, removable pin which extends through eyes in a pair of vertically spaced yoke arms on the upper side of the trailer platform, at its forward end, the two yoke arms receiving a rearwardly extending tongue of the sweeper. Rearwardly of the rotary brush, there is a fixed, horizontal plate which extends rearwardly toward the trailer. This fixed plate carries a hinge at its front edge, and a support plate has its front edge connected to the hinge, the support plate extending rearwardly from the hinge and overlying the fixed plate and the articulated connection. On the support plate there is an upwardly and rearwardly extending guide, forming a part of a guide channel. Forwardly and upwardly of the guide is a front panel structure, including a lower front panel hinged at its lower end by a transverse, horizontal hinge, there being an upper front panel hingedly connected at its lower end to a brace above the lower front panel. The lower front panel preferably is provided with transparent plates, so that an operator may view the debris passing through the channel, to determine if the machine is functioning properly. A pair of vertical side panels on the sweeper complete the guide channel. The trailer at each side carries a flexible, upstanding side guide, having its rear end adjacent a side of the receptacle, and its front end adjacent to the side panels of the sweeper.

Among the objects of the present invention is to provide a sweeper and trailer permitting effective cleaning of lawns having curved borders.

Another object of the present invention is the provision of a lawn sweeper and an articulated trailer.

A further object of the present invention is to provide a lawn sweeper and trailer which is articulated, and having guides to ensure that material discharged by the sweeper reaches receptacles on the trailer.

Another object of the present invention is to provide a sweeper and articulated trailer, providing ready access to a connection for connection and disconnection of the sweeper and trailer.

A further object is the provision of a lawn sweeper which has sufficient capacity to avoid frequent unloading.

Other objects and many of the attendant advantages of the present invention will be readily understood from the following specification and claims.

DESCRIPTION OF THE PREFERRED EMBODIMENTS

Figure 1:
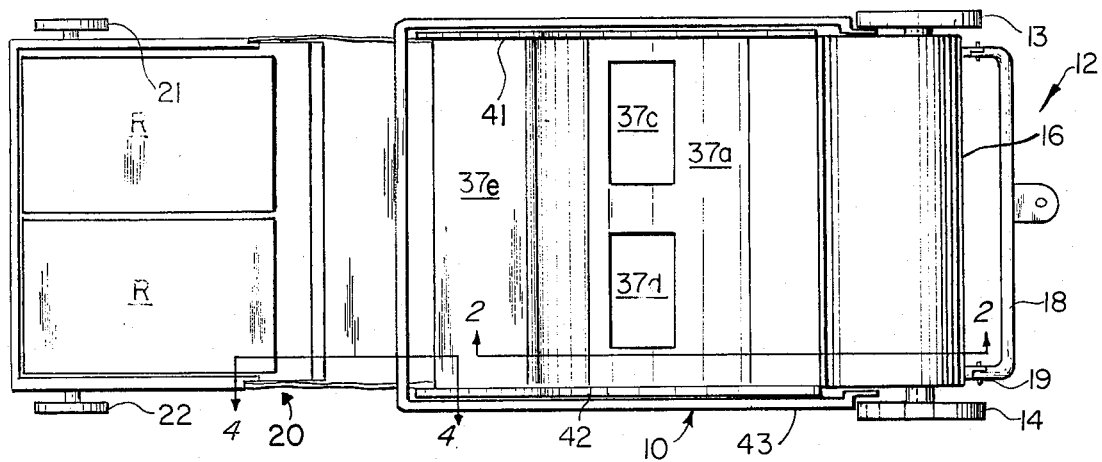
FIG. 1 is a plan view of a sweeper and trailer in accordance with the present invention.

Referring now to the drawings, wherein like or corresponding reference numerals are used to designate like or corresponding parts throughout the several views, there is shown in FIG. 1 a plan view of a combined sweeper and trailer vehicle, generally designated 10, including a sweeper 12 having wheels 13 and 14 and a housing 16, within which is a brush. In conventional manner, movement of the wheels 13 and 14 causes, through suitable mechanism such as gears or chain and sprocket, rotation of the brush. Rearwardly of the sweeper 12 is a trailer vehicle, designated 20, including wheels 21 and 22, the trailer vehicle mounting a pair of receptacles R. The sweeper portion 12 also includes a tow bar 18, which may be pivoted at 19.

Figure 2:
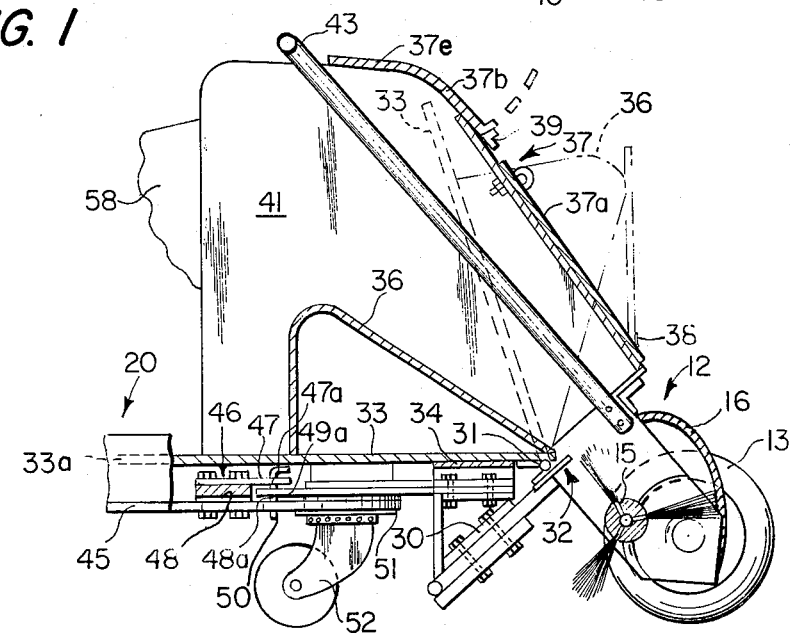
FIG. 2 is a cross sectional view taken on the line 2—2 of FIG. 1.

Referring now to FIG. 2, there may be seen the sweeper 12 with wheel 13, and there may also be seen the brush 15 which is rotated on a horizontal axis so as to sweep leaves and other debris from a lawn, or the like. Forming part of the sweeper 12, and positioned somewhat rearwardly of the brush 15, is a fixed plate 30 shown being inclined downwardly and to the left. The plate 30 has a portion of a hinge 31 secured to its front edge, with the axis of the hinge horizontal. There is also provided a striker plate 32, positioned in juxtaposition with the brush 15, so as to remove any leaves or material from the brush 15 as the latter rotates.

The hinge 31 has fastened to it the forward edge of a support plate 33, having a rear edge 33a. An abutment 34 extends beneath the support plate 33, limiting its movement in a counter-clockwise direction on the hinge 31 to the position shown.

A guide channel is provided for confining and directing upwardly and rearwardly the discharge from the brush 15, the guide channel including an upwardly and rearwardly inclined guide plate 36 which is mounted on and carried by the support plate 33. As is clearly shown by the dotted line position of the parts in FIG. 2, support plate 33 and the guide plate 36 move together. Above and to the right of the guide plate 36 is a front cover 37, comprising a lower front cover panel 37a and an upper front cover panel 37b. The panel 37a is supported by a hinge 38 at its lower end, for movement to the dotted line position shown, and the panel 37b is hinged at 39 to a brace above the lower front cover panel 37a. Acess to the debris channel is had by opening the panels 37a and 37b, to in turn provide access to the brush and support plate 33.

Referring to FIG. 1, it may be seen that the lower front cover panel 37a comprises a pair of transparent panels 37c and 37d, which may be made of a suitable material such as transparent plastic, glass or the like.

Also forming part of the material discharge panel are a pair of upstanding side panels 41 and 42 (see also FIG. 1), the side panels 41 and 42 extending from the front of the sweeper 12 rearwardly, almost to the rear edge 33a of the support plate 33. Consequently, material discharged by the brush 15 will move upwardly and rearwardly, above the guide plate 36, and below the front cover panel 37, and between the side panels 41 and 42: it will be noted that the upper cover panel 37b has a nearly horizontal portion 37e at its rear end.

The sweeper 12 further includes a generally U-shaped brace 43, by which it may be readily moved from place to place, when disengaged from the trailer 20. However, in order to engage the sweeper 12 with the trailer 20, the trailer 20 is provided with a platform 45, forming its bed, and it is on the platform 45 that the aforementioned receptacles R are positioned. Near the front end of the platform 45 is a yoke 46, including an upper arm 47 having an eye 47a, a lower arm 48 with an aligned eye 48a. Extending rearwardly from the sweeper 12 is a tongue 49, provided with an eye 49a, and a removable pin 50 is inserted through the aligned eyes, to provide an articulated connection between the sweeper 12 and the trailer 20.

To provide additional support for the structure, below the forward end of the platform 45 is a support 51 for a caster wheel 52.

Figure 3:
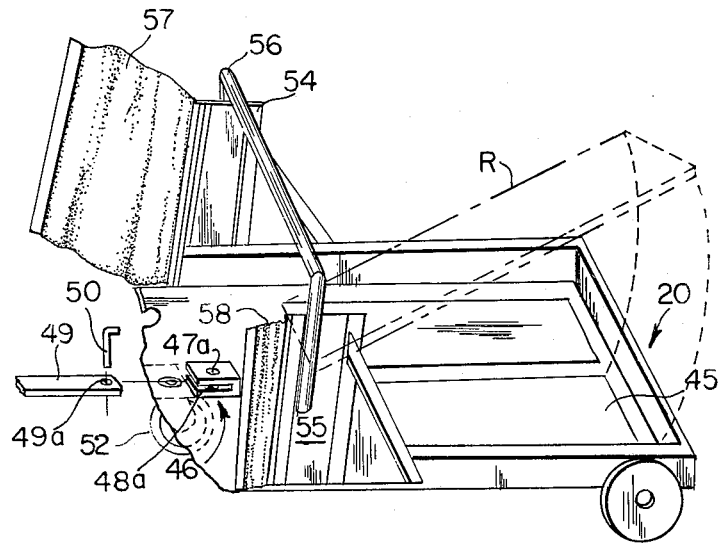
FIG. 3 is a perspective view of the trailer and a portion of the tongue of the sweeper.

Referring now to FIG. 3, there may be seen the trailer 20, with platform 45, yoke 46 and caster wheel 52. There may also be seen the tongue 49 of the sweeper. A pair of upstanding side boards 54 and 55 are provided, and a U-shaped bracket or handle 56 extends between them, being secured to them. Secured to each of the upstanding side boards 54 and 55 is a side guide 57, 58, each of which extends generally forwardly, as shown in FIG. 3.

Figure 4:
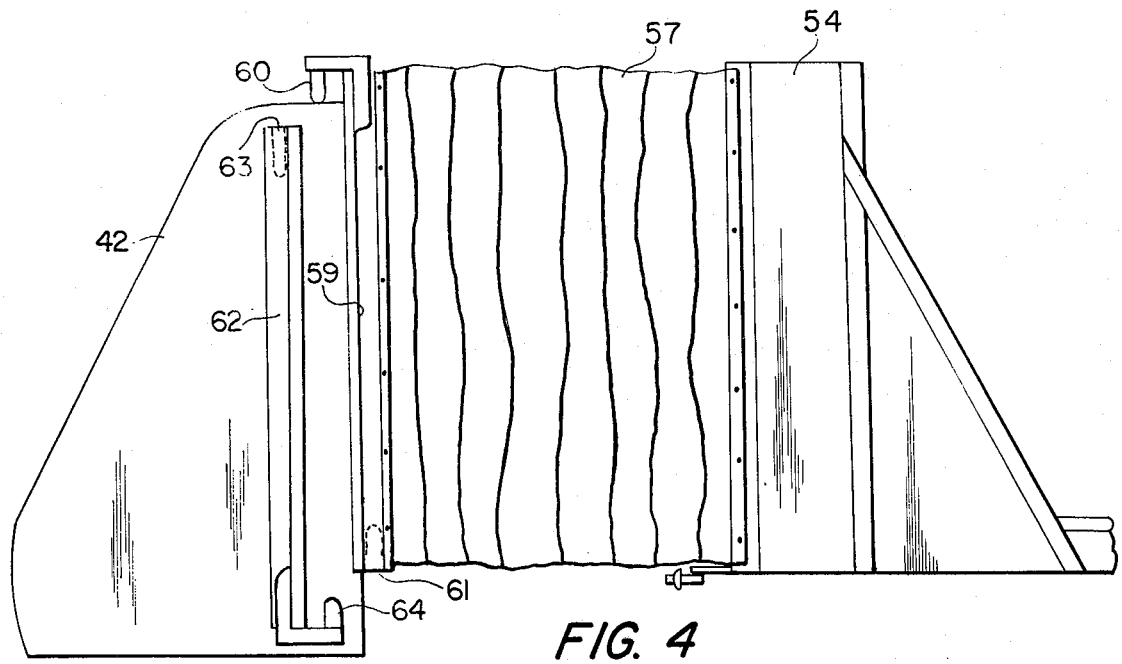
FIG. 4 is a view taken generally on the line 4—4 of FIG. 1.

In FIG. 4, there is shown the flexible side guide 57, secured at its rear end to the upstanding side board 54, and having at its forward end a bar 59 which is provided at its upper end a downwardly depending pin 60. At its lower end, the bar 59 is provided with a recess 61. The side panel 41 is provided with a bar 62, having at its upper end a recess 63 for receiving the pin 60, and having at its lower end an upstanding pin 64, which is sized to be received in the recess 61 of the bar 59.

As will be understood, the flexible side guides ensure that when the sweeper 10 is not in line with the trailer 20, the material discharged by the brush will not be permitted to fall back onto the lawn, but instead will strike one or the other of the flexible side guides, and thence be directed to the receptacle or receptacles on the trailer 20.

In order to disconnect the sweeper 12 from the trailer 20, it is only necessary to disengage the flexible side guides 57 and 58 from the side panels of the sweeper, and to then lift the support plate 33, so that the pivot pin 50 is exposed, and may be removed. The sweeper 12 may readily be moved by the handle 43 and the trailer 20 may be readily moved by the handle 56. As will be understood, the front cover panel 37 may also be pivoted, in order to provide space for the guide plate 36, when the support 33 is moved as indicated.

Further, the functioning of the apparatus may be monitored by the workman on the tractor observing the action of the sweeper through the above mentioned transparent panels.

Figure 5:
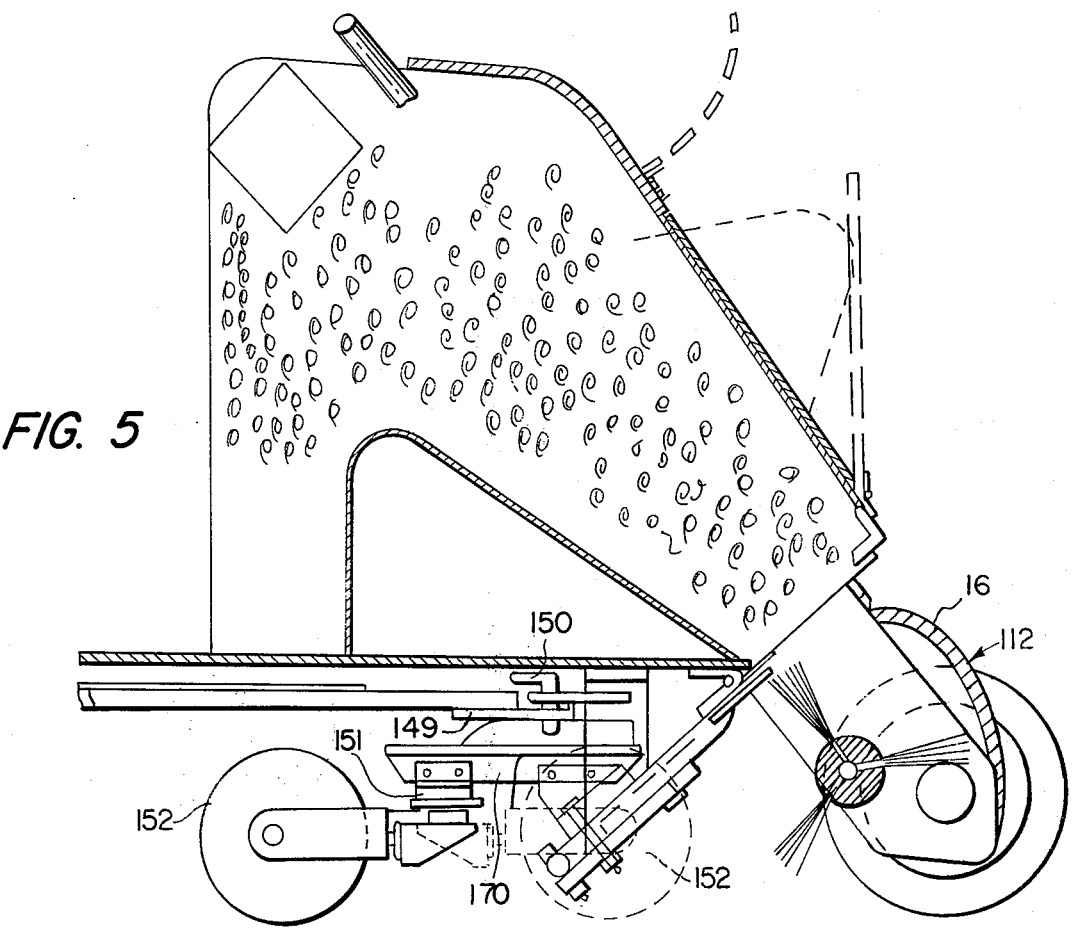
FIG. 5 is a view similar to FIG. 2, showing an alternate embodiment.

In FIG. 5, there is shown a modified apparatus, which is generally similar to the sweeper 12 and trailer 20, except that the caster wheel 152 is carried by a support 151 carried by a plate 170 forming a part of the sweeper 112. The trailer is provided with a forwardly extending tongue 149 which is connected by a pin 150 to a tongue 171 supported by the sweeper 112. Thus, the construction shown in FIG. 5 also provides the same general functioning, except that the tongue is attached to the trailer and the caster wheel is attached to the sweeper. The caster wheel 152 may pivot on its vertical axis through 360°, to permit ready manual movement of the trailer when it is detached.

It will be obvious to those skilled in the art that various changes may be made without departing from the spirit of the invention, and therefore the invention is not limited to what is shown in the drawings and described in the specification but only as indicated in the appended claims.

I claim:

1. A lawn sweeper and articulated vehicle comprising:

a lawn sweeper having a pair of laterally spaced wheels and rotatable sweeper brush means for discharging material upwardly and toward said vehicle, said vehicle receiving debris discharged by said sweeper and including a platform having a pair of support wheels, said platform being adapted to support removable receptacle means, means for connecting said vehicle to said sweeper for articulation on a vertical axis located substantially on the vertical median plane of each of said sweeper and vehicle, and means for guiding material discharged by said brush means to said platform when said vehicle is not in line with said sweeper as said vehicle articulates on said connecting means relative to said sweeper during turning movement of said sweeper and vehicle, comprising flexible side guide means connected to said vehicle and said sweeper.

2. The structure of claim 1, and further comprising a caster wheel secured beneath the platform remote from said support wheels.

3. The structure of claim 1, said connecting means comprising a yoke on the platform, a tongue extending from said sweeper, and a vertical pin extending through openings in said yoke and tongue.

4. A lawn sweeper and articulated vehicle comprising:

a lawn sweeper having a pair of laterally spaced wheels and rotatable sweeper brush means for discharging material upwardly and toward said vehicle, said vehicle receiving debris discharged by said sweeper and including a platform having a pair of support wheels, said platform being adapted to support removable receptacle means, means for connecting said vehicle to said sweeper for articulation on a vertical axis located substantially on the vertical median plane of each of said sweeper and vehicle, and means for guiding material discharged by said brush means to said platform when said vehicle is not in line with said sweeper as said vehicle articulates on said connecting means relative to said sweeper during turning movement of said sweeper and vehicle, comprising an upwardly inclined guide plate extending from said brush means and inclined cover panel means spaced from and generally parallel to said guide plate for providing an inclined channel for debris extending from said brush means toward said vehicle, said cover panel comprising a lower cover panel horizontally hinged at its lower edges, and an upper cover panel horizontally hinged to a brace above said lower cover panel, whereby said upper and lower cover panels may be opened to provide access to the interior of said debris passage.

5. The structure of claim 4, said last mentioned means further comprising a pair of generally vertical side panels bounding said inclined guide plate and cover panel means.

6. The structure of claim 5, wherein said guiding means further comprises flexible side guide means for extending said debris channel from said sweeper to said vehicle.

7. The structure of claim 6, said last mentioned means comprising a pair of flexible side panels connected to said vehicle and said sweeper.

8. The structure of claim 4, said cover panel means comprising transparent panels for permitting viewing of debris discharged by said brush means.

9. The structure of claim 1, wherein said connecting means is located at the front of said vehicle.

10. A lawn sweeper and articulated vehicle comprising:

a lawn sweeper having a pair of laterally spaced wheels and rotatable sweeper brush means for discharging material upwardly and toward said vehicle, said vehicle receiving debris discharged by said sweeper and including a platform having a pair of support wheels, said platform being adapted to support removable receptacle means, means for connecting said vehicle to said sweeper for articulation on a vertical axis located substantially on the vertical median plane of each of said sweeper and vehicle, and means for guiding material discharged by said brush means to said platform when said vehicle is not in line with said sweeper as said vehicle articulates on said connecting means relative to said sweeper during turning movement of said sweeper and vehicle, comprising an upwardly inclined guide plate extending from said brush means and generally parallel inclined cover panel means spaced from said guide plate for providing an inclined channel for debris extending from said brush means toward said vehicle, said sweeper having a fixed plate extending rearwardly from said brush, a support plate hinged at its front edge to the front of said fixed plate and overlying said connecting means, said guide plate being carried by said support plate, whereby said support plate and guide plate may be swung on said hinge to provide access to said connecting means.

* * * * *